US011953850B2

(12) United States Patent
Uezono et al.

(10) Patent No.: US 11,953,850 B2
(45) Date of Patent: Apr. 9, 2024

(54) HEATER AND IMAGE HEATING APPARATUS

(71) Applicant: CANON KABUSHIKI KAISHA, Tokyo (JP)

(72) Inventors: Takaomi Uezono, Shizuoka (JP); Takao Kawazu, Shizuoka (JP); Teruhiko Namiki, Shizuoka (JP); Atsushi Iwasaki, Shizuoka (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/690,519

(22) Filed: Mar. 9, 2022

(65) Prior Publication Data

US 2022/0299917 A1 Sep. 22, 2022

(30) Foreign Application Priority Data

Mar. 16, 2021 (JP) ................................ 2021-042865

(51) Int. Cl.
*G03G 15/20* (2006.01)

(52) U.S. Cl.
CPC ................................ *G03G 15/2053* (2013.01)

(58) Field of Classification Search
CPC ........... G03G 15/2017; G03G 15/2053; G03G 2215/2003
See application file for complete search history.

(56) References Cited

U.S. PATENT DOCUMENTS

| | | | | |
|---|---|---|---|---|
| 2011/0062140 | A1* | 3/2011 | Sakakibara | H05B 1/0241 219/539 |
| 2012/0201582 | A1* | 8/2012 | Shimura | G03G 15/2053 399/329 |
| 2013/0343791 | A1* | 12/2013 | Shimura | H05B 3/03 399/329 |
| 2014/0003848 | A1* | 1/2014 | Sakakibara | H05B 3/03 399/335 |

FOREIGN PATENT DOCUMENTS

| | | |
|---|---|---|
| JP | 2005209493 A | 8/2005 |
| JP | 2011151003 A | 8/2011 |
| JP | 2014134819 A | 7/2014 |

* cited by examiner

*Primary Examiner* — Thomas S Giampaolo, II
(74) *Attorney, Agent, or Firm* — Canon U.S.A., Inc. I.P Division

(57) ABSTRACT

A heater for use in an image heating apparatus includes a substrate, first and second conductors provided on the substrate, and heating elements. The heating elements are arranged between, and electrically connected in parallel to, the first and second conductors. When n denotes a number of heating elements, connected to one second conductor, in one row of the heating elements, a width L denotes a sum (n×Wh) of widths, as seen in a longitudinal direction of the substrate, of shortest current paths of all respective heating elements connected to the one second conductor plus a sum of widths, as seen in the longitudinal direction, of respective gaps between adjacent shortest current paths, and a ratio R denotes a ratio of the sum (n×Wh) of widths to the width L, the heating elements are configured so as to satisfy 0.54≤the ratio R<1.

18 Claims, 10 Drawing Sheets

| Wh | SP | HEAT GENERATION RATIO R | TEMPERATURE UNEVENNESS (°C) | RATIO d/A |
|---|---|---|---|---|
| 1.2 | 1.4 | 0.46 | 2 | 124% |
| 1.4 | 0.3 | 0.80 | 1 | 127% |
| 2.1 | 0.6 | 0.78 | 0.5 | 161% |
| 2.1 | 0.5 | 0.80 | 0.5 | 179% |
| 2.1 | 0.2 | 0.93 | 0.5 | 161% |
| 1.8 | 0.2 | 0.89 | 0.2 | 146% |
| 1.7 | 0.6 | 0.75 | 0.1 | 152% |
| 1.9 | 0.3 | 0.85 | 0.1 | 166% |

HEATER AND IMAGE HEATING APPARATUS

BACKGROUND

Field

The present disclosure relates to an image heating apparatus such as a fixing units installed in an electrophotographic image forming apparatus such as a copying machine, a printer, or the like, a surface treatment apparatus configured to change a gloss or a surface property of a toner image fixed on an recording sheet by reheating the toner image, and more specifically, relates to an image heating apparatus configured to heat a toner image via a cylindrical film. The present disclosure also relates to a heater used in the image heating apparatus.

Description of the Related Art

When printing is continuously performed on small-size sheets using an image forming apparatus equipped with a fixing unit using a cylindrical film, a gradual increase in the temperature may occur in a region through which the sheets (recording sheets) do not pass (hereinafter, this phenomenon will also be referred to as a temperature rise in the non-sheet-feeding region). One of known methods of suppressing the temperature rise in the non-sheet-feeding region is to provide a plurality of heating elements arranged in a longitudinal direction of the heater on a substrate of the heater that is in contact with the inner surface of the film, and reduce the temperature rise by using the positive temperature coefficient (PTC) characteristics of the heating elements (see, for example, Japanese Patent Laid-Open No. 2005-209493).

In a case where the number of heating elements disposed per unit area is small, the temperature distribution of the heater may become uneven. This fact needs to be taken into account in determining shapes of the heating elements. If the pitch between adjacent heating elements is reduced, i.e., the number of heating elements in the longitudinal direction of the heater is increased, the unevenness of temperature distribution can be suppressed.

However, the total resistance of the heater needs to be equal to a specified specific value, and thus the increasing of the number of heating elements needs a higher sheet resistance for the heating elements. If the sheet resistance of the heating elements is high, there is a concern that the resistance to surges such as lightning surges will be reduced. In the heating elements having high sheet resistance, materials of heating elements contain a large amount of glass component, which tends to cause a reduction in the surge resistance.

SUMMARY

Disclosed is a heater having heating elements where the shape and arrangement of the heating elements can satisfy both small temperature unevenness in the longitudinal direction of the heater and high surge resistance.

According to an aspect of the present disclosure, a heater for use in an image heating apparatus includes a substrate, a first conductor and at least one second conductor provided on the substrate along a longitudinal direction of the substrate, and a plurality of heating elements arranged between the first conductor and the at least one second conductor and electrically connected in parallel to the first conductor and the at least one second conductor, wherein, when n denotes a number of heating elements, connected to one second conductor, in one row of heating elements disposed on the heater, a width L denotes a sum (n×Wh) of widths, as seen in the longitudinal direction, of shortest current paths of all respective heating elements connected to the one second conductor plus a sum of widths, as seen in the longitudinal direction, of respective gaps between adjacent shortest current paths, and a ratio R denotes a ratio of the sum (n×Wh) of widths to the width L, the plurality of heating elements are configured so as to satisfy 0.54≤the ratio R<1.

Further features of the present disclosure will become apparent from the following description of exemplary embodiments with reference to the attached drawings.

BRIEF DESCRIPTION OF THE DRAWINGS

FIG. 3A is a cross-sectional view of the heater, FIG. 3B is a plan view of a back surface layer #1, FIG. 3C shows a back surface layer #2, FIG. 3D is a plan view of a sliding surface layer #1, and FIG. 3E is a plan view of a sliding surface layer #2.

DESCRIPTION OF THE EMBODIMENTS

First Embodiment

Configuration of Image Forming Apparatus

Figure 1:
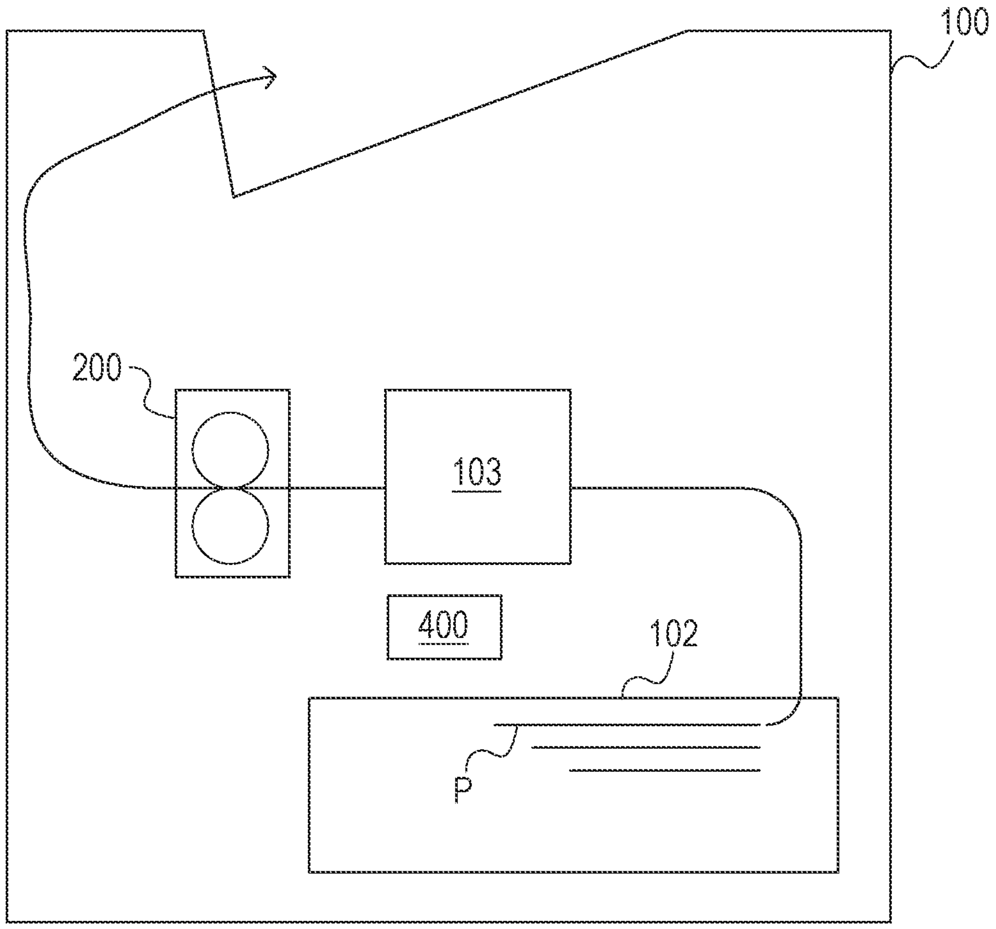
FIG. 1 is a cross-sectional view of an image forming apparatus.

FIG. 1 shows an example of an overview of a configuration of an image forming apparatus 100 according to a first embodiment. The image forming apparatus 100 is a laser printer using an electrophotographic recording technique. A recording sheet P loaded on a sheet feed unit 102 is transported to an image forming unit 103 at a predetermined timing. The image forming unit 103 includes a charging unit, an exposure unit, a development unit, a cleaning unit, a photosensitive drum, and a transfer unit (not shown). The image forming unit 103 performs a series of known electrophotographic processes using laser light emitted from the exposure unit, and transfers an unfixed toner image formed on the photosensitive drum to the recording sheet P. The recording sheet P having the unfixed toner image transferred from the photosensitive drum is transported to a fixing unit (an image heating apparatus) 200, and the fixing unit 200 heats and pressurizes the recording sheet P so as to fix the toner image on the recording sheet P. After that, the recording sheet P is discharged to the outside of the image forming apparatus 100. The series of control processes described above is performed by a control circuit 400 including a CPU, which is a control unit.

Configuration of Fixing Unit 200

Figure 2:
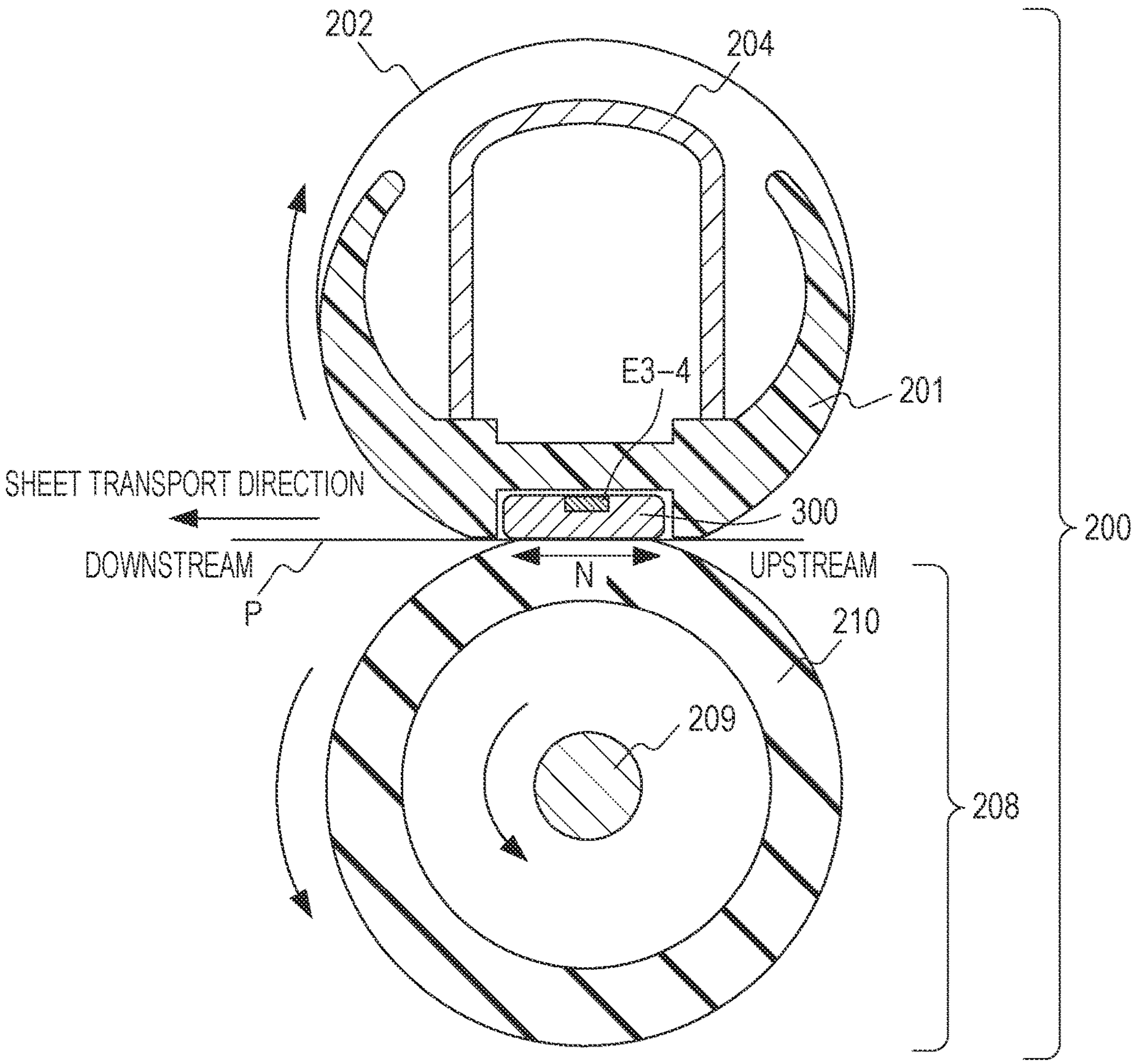
FIG. 2 is a cross-sectional view of a fixing unit.

FIG. 2 is a cross-sectional view of the fixing unit 200 according to the present embodiment. The fixing unit 200 includes a cylindrical film 202 having a cylindrical shape, a heater 300 provided in an internal space of the cylindrical film 202, and a pressure roller (a nip part forming member) 208 that forms a fixing nip part N together with the heater 300 via the film 202. A material of a base layer of the film 202 is a heat-resistant resin such as polyimide or a metal such as stainless steel. A surface layer of the film 202 may include an elastic layer such as heat-resistant rubber and/or a fluororesin layer. The pressure roller 208 includes a core metal 209 made of a material such as iron or aluminum, and an elastic layer 210 made of a material such as silicone rubber. The heater 300 is held by a holding member 201 made of a heat-resistant resin. The holding member 201 also has a guide function for guiding the rotation of the film 202. A stay 204 is a metal stay for applying a pressure of a spring (not shown) to the holding member 201. The pressure roller 208 is driven by a motor (not shown) to rotate in a direction indicated by an arrow. The rotation of the pressure roller 208 causes the film 202 to rotate. The recording sheet P bearing an unfixed toner image is fixed by being heated while the recording sheet P is clipped and conveyed by the fixing nip part N. The heater 300 is a heat source having a heat generation resistor described later, and includes a plurality of electrodes (E3-1 to E3-9) for receiving electric power. FIG. 2 shows one of the electrodes (more specifically, an electrode E3-4). The holding member 201 has holes formed at locations corresponding to the respective electrodes E3-1 to E3-9, and is configured such that an electrical contact is formed in each hole for connection with a terminal of a power supply (not shown).

Configuration of Heater 300

FIGS. 3A to 3E are each a diagram illustrating a configuration of the heater 300 according to the present embodiment.

Figure 3A:
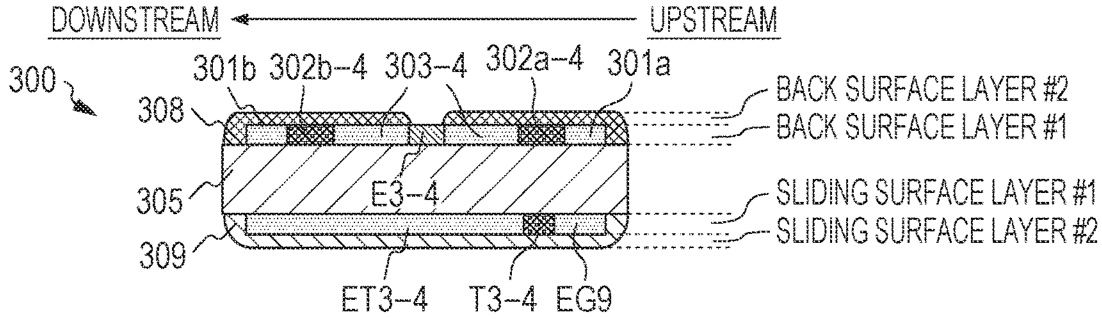
FIGS. 3A to 3E are each a diagram illustrating a configuration of a heater according to a first embodiment, and more specifically
Figure 3B:
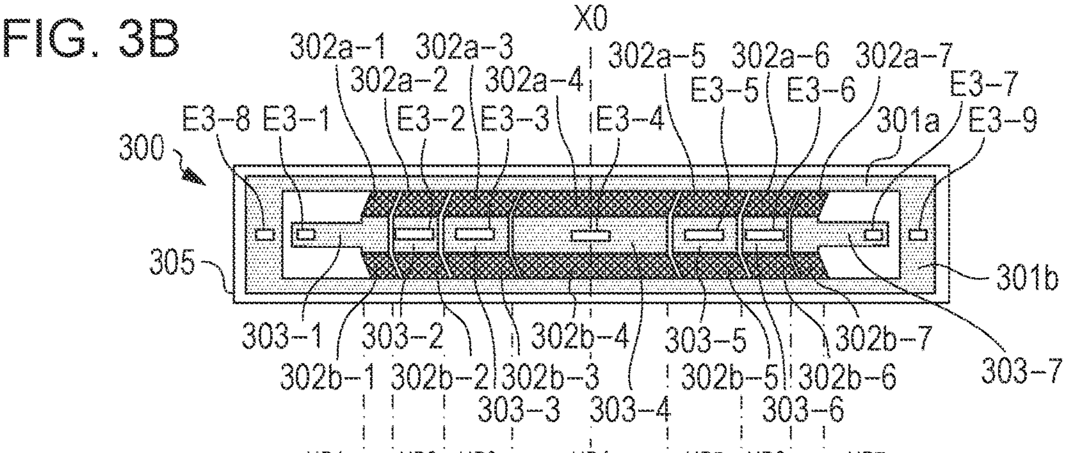
Figure 3C:
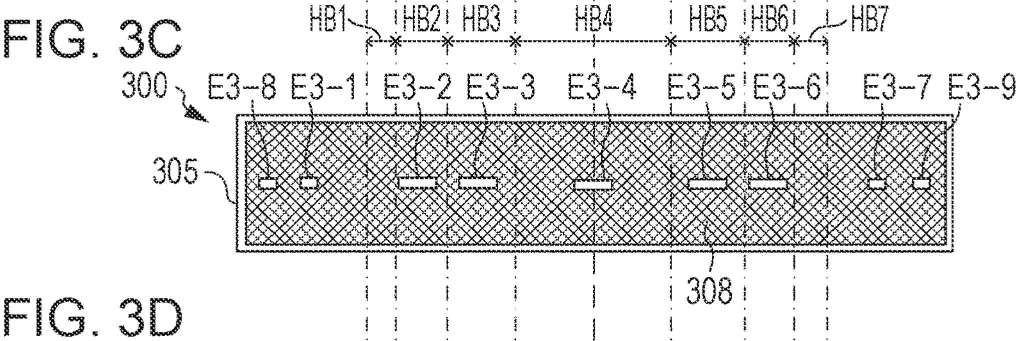
Figure 3D:
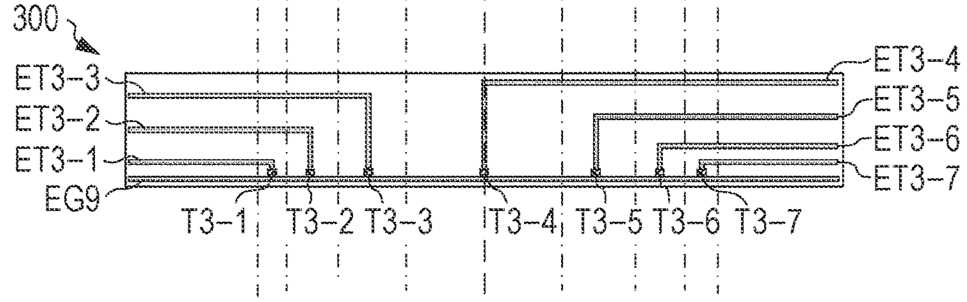
Figure 3E:
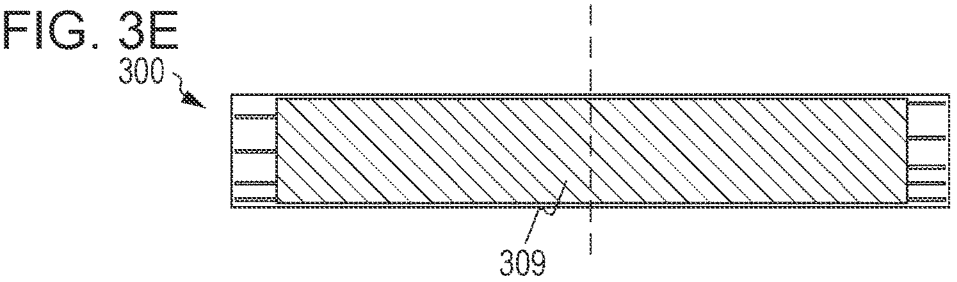

FIG. 3A is a cross-sectional view of the heater 300, and FIGS. 3B to 3E are each a plan view thereof. More specifically, FIG. 3B shows a back surface layer #1, FIG. 3C shows a back surface layer #2, FIG. 3D shows a sliding surface layer #1, and FIG. 3E shows a sliding surface layer #2. X0 in FIGS. 3B to 3E indicates a transport reference position of the recording sheet P in the image forming apparatus 100 according to the present embodiment, and the cross-sectional view of FIG. 3A shows a cross-sectional view of the heater 300 taken at the transport reference position X0.

As shown in FIG. 3A, the heater 300 includes conductors 301*a* and 301*b* and conductors 303-4 on an alumina substrate 305. The conductors 301*a* and 301*b* are also referred to as first conductors, and the conductors 303-4 are also referred to as second conductors. The conductors 301*a* is located upstream and the conductor 301*b* is located downstream in the direction in which the recording sheet P is transported. The heater 300 includes two rows of heating elements 302, each of which is configured to generate heat by supplied electric power, wherein the two rows of heating elements each extends in a longitudinal direction of the heater 300 and the two rows are arranged side by side in a lateral direction of the heater 300. More specifically, one of the two rows of heating elements is disposed between conductors 301*a* and 303-4 and the other one is disposed between conductors 301*b* and 303-4 on the substrate. Although in the present embodiment, the heating elements 302 are configured to be arranged in two rows, the heater 300 may include another number of rows of heating elements 302 arranged side by side in the lateral direction of the heater 300. The heating elements 302 are separated into heating elements 302*a*-4 and 302*b*-4 wherein the heating element 302*a*-4 is disposed on an upstream side in a direction of transporting the recording sheet P and the heating element 302*b*-4 is disposed on a downstream side. An electrode E3-4 is disposed at the transport reference position X0 defined in the longitudinal direction of the heater. An insulating protective glass layer 308 is provided as a back surface layer #2 such that the protective glass layer 308 covers a region of the substrate other than the electrodes E3-1 to E3-9 as shown in FIG. 3C.

Furthermore, printed thermistors T3-1 to T3-7 are disposed in the sliding surface layer #1 as shown in FIG. 3D. Each of these thermistors has a negative temperature dependence and the resistance value thereof decreases as the temperature increases. The thermistors T3-1 to T3-7 are covered with a glass layer 309 functioning as a sliding surface layer #2 as shown in FIG. 3E.

As shown in FIG. 3B, on a back surface layer #1 of the heater 300, a plurality of heat generation blocks (heating regions) each including a set of a conductor 301, a conductor 303, a heating element 302, and an electrode E3 are disposed along the longitudinal direction of the heater 300. More specifically, in the present embodiment, seven heat generation blocks (HB1 to HB7) are provided. The heat generation block is also referred to as a heating element group. Hereinafter, members corresponding to the respective heat generation blocks will be denoted such that reference symbols thereof include numerals indicating corresponding specific heat generation blocks. More specifically, the heating elements are denoted such as heating elements 302*a*-1 to 302*a*-7. The heating elements 302 in the respective heat generation blocks have the same resistivity per unit length at a predetermined temperature (for example, at a normal temperature), and the same amount of heat per unit length is generated. Among the heat generation blocks HB1 to HB7, as shown in FIGS. 3B to 3E, the heat generation block HB4 has the longest region in the longitudinal direction of the heater, and the heat generation blocks HB1 and HB7 have the shortest region. The electrodes E3-8 and E3-9 are electrodes to which terminals having polarities electrically different from those of the heater electrodes E3-1 to E3-7 are connected The electrodes E3-8 and E3-9 are provided separately such that one of them is located at one end of the heater 300 in the longitudinal direction and the other one is located at the opposite end.

A surface protection layer 308 is provided on the back surface layer #2 of the heater 300 such that the heater electrodes E3-1 to E3-9 are exposed.

On the sliding surface layer #1 which is an opposite surface, thermistors T3-1 to T3-7 functioning as temperature detection elements are disposed to detect temperatures of the respective heat generation blocks of the heater 300. These temperature detection elements are used to control the temperatures of the respective heat generation blocks. One end of each of the thermistors T3-1 to T3-7 is connected to corresponding one of the conductors ET3-1 to ET3-7 for detecting the resistance values of the thermistors, and the other end is connected to a common conductor EG9.

The sliding surface layer #2 of the heater 300 is provided with a surface protection layer 309 coated with slidable glass. The surface protection layer 309 is provided except on both ends of the heater 300 such that the conductors ET3-1 to ET3-7 and the common conductor EG9 are exposed.

Control Circuit 400 of Heater 300

Figure 4:
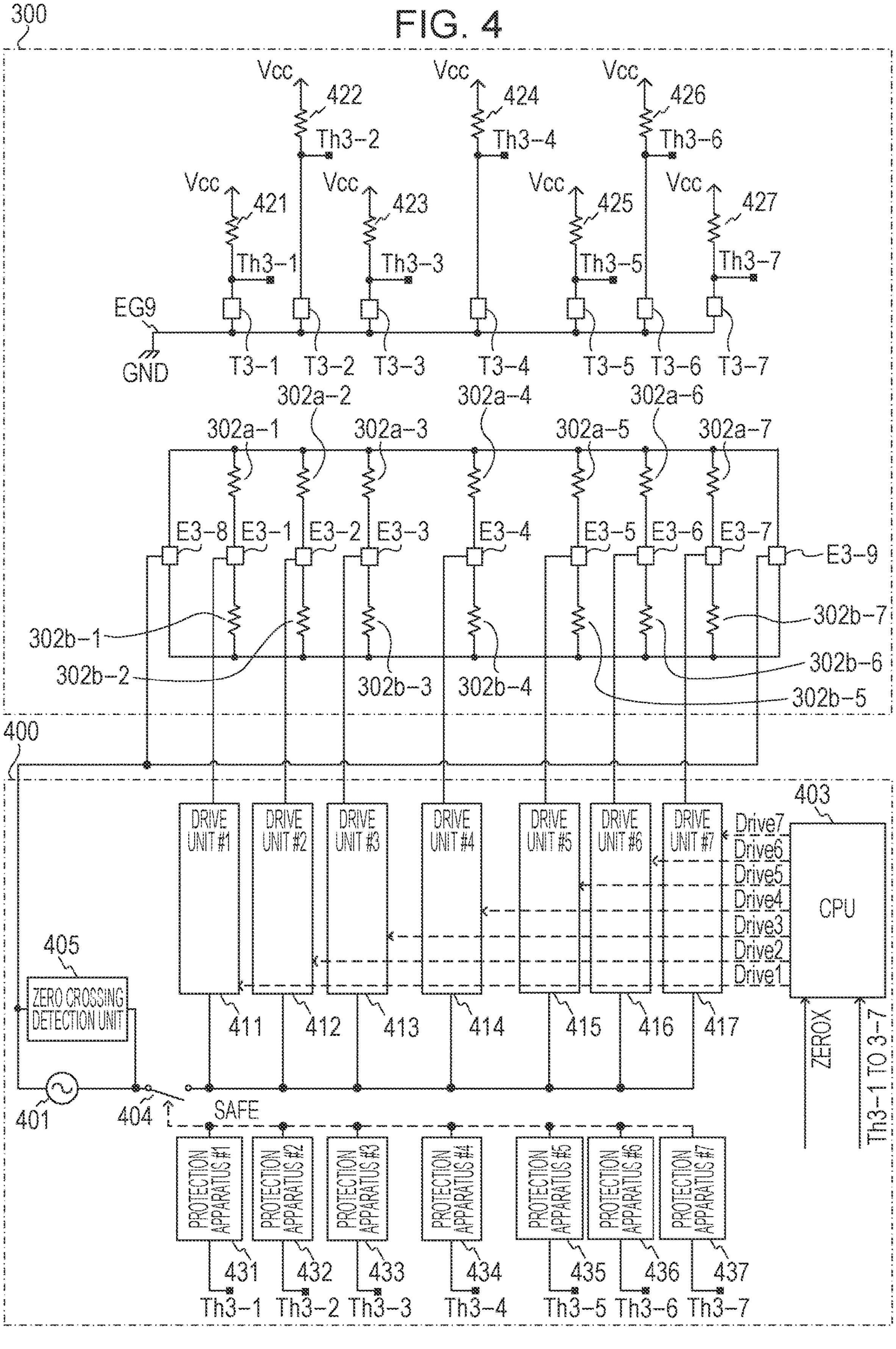
FIG. 4 is a circuit diagram of a control circuit according to the first embodiment.

FIG. 4 is a diagram showing a control circuit 400 according to present embodiment. A commercial AC power supply 401 is connected to the image forming apparatus 100. A DC voltage Vcc is generated by an AC/DC converter (not shown) connected to the AC power supply 401, and is used in detection operations by thermistors T3-1 to T3-7, and the like. A zero-crossing detection unit 405 generates a ZEROX signal when the AC voltage crosses an intermediate potential and supplies the resultant ZEROX signal to the CPU 403. Thermistor signals Th3-1 to Th3-7 are generated by dividing the voltage Vcc respectively by the thermistors T3-1 to T3-7 and the resistors 421 to 427, and are input to the CPU 403. Based on the thermistor signals Th3-1 to Th3-7 and the ZEROX signal, the CPU 403 generates drive signals Drive1 to Drive7 thereby controlling drive units 411 to 417. The drive units 411 to 417 turn on/off current paths by using switch elements such as triacs. The power supplied to the heating elements 302*a* and 302*b* of the heater 300 is controlled the CPU 403 such that temperatures of the heat generation blocks HB1 to HB7 are maintained at target temperature values set for the heat generation block HB1 to HB7. In the present example, a target temperature of a heat generation block located in a region where the recording sheet P does not pass is set to be lower than target temperatures of heat generation blocks located in regions where the recording sheet P passes. Protection apparatuses 421 to 427 monitor heat generation blocks to detect an abnormal temperature based on the thermistor signals Th3-1 to Th3-7. When an abnormal temperature is detected, a SAFE signal is generated thereby forcibly turning off a relay 404 to cut off the power supplied to the heater 300.

Shape of Heating Element of Heater 300

Figure 5:
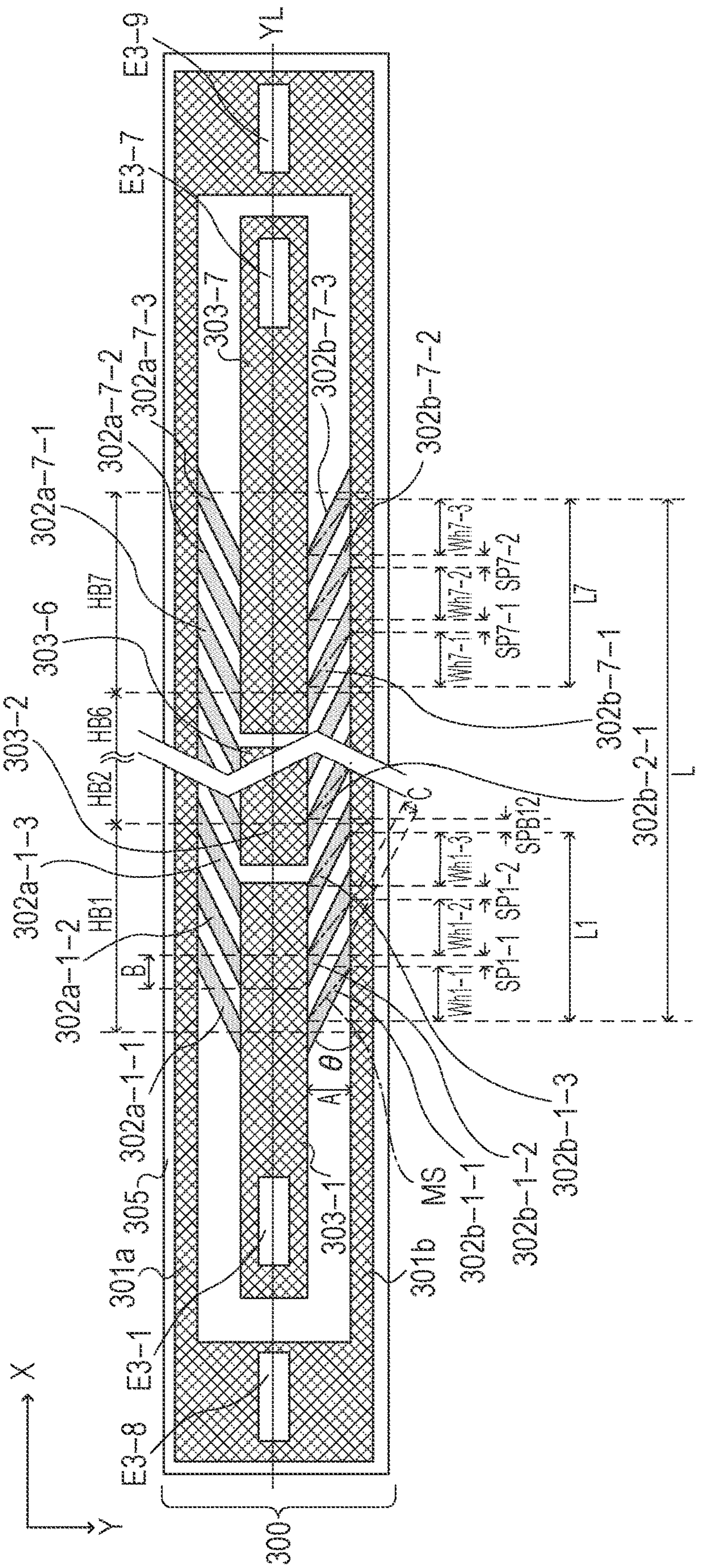
FIG. 5 is an enlarged view of the heater according to the first embodiment.

FIG. 5 is an enlarged view of a part of the heater 300 shown in FIG. 3B. In FIG. 5, the longitudinal direction of the heater 300 is defined as an X direction, and the lateral direction of the heater 300, which is also a direction of transporting the recording sheet P, is defined as a Y direction.

In the present embodiment, the shape of the heating element 302*a* on the upstream side and the shape of the heating element 302*b* on the downstream side in the Y direction are line-symmetrical with respect to the center line YL at the center, as seen in the Y direction, of the heater 300, and have the same dimensions. Therefore, the shape of the heating element will be described below taking as an example the heating element 302*b* located on the downstream side, and the description of the heating element 302*a* on the upstream side will be omitted. A plurality of heating elements are provided in each heat generation block. For example, in the heat generation block HB1, as shown in FIG. 5, there are a total of three heating elements 302*a*-1-1, 302*a*-1-2, and 302*a*-1-3 as heating elements 302*a* on the upstream side.

As the heating elements 302*b* on the downstream side, there are a total of three heating elements 302*b*-1-1, 302*b*-1-2, and 302*b*-1-3. Therefore, the heat generation block HB1 includes a total of 3×2=6 heating elements. Similarly, the heat generation block HB7 includes a total of six heating elements: 302*a*-7-1, 302*a*-7-2, 302*a*-7-3, 302*b*-7-1, 302*b*-7-2, and 302*b*-7-3. Although omitted in FIG. 5, each of the heat generation blocks HB2 and HB6 includes a total of 6×2=12 heating elements. The heat generation blocks HB3 and HB5 each include a total of 8×2=16 heating elements. The heat generation block HB4 includes a total of 66×2=132 heating elements. Thus, as a whole, a total of 200 heating elements are provided in the heater 300. The 100 heating elements 302*a* are all the same in shape, and the 100 heating elements 302*b* are also the same in shape. The shapes of the heating elements 302*a* and 302*b* are all parallelograms.

As shown in FIG. 5, the three heating elements 302*b* of the heat generation block HB1, that is, the heating elements 302*b*-1-1 to 302*b*-1-3 are connected in parallel to the conductor 303-1. An alternate long and short dash line MS shown on the heating element 302*b*-1-1 indicates the shortest current path of the heating element 302*b*-1-1 (a shorter one of two diagonals of one heating element). The other heating elements each also have a shortest current path MS. In FIG. 5, reference numeral A indicates the distance between the conductor 301 and the conductor 303. Reference symbol B indicates a short side of each heating element. Reference symbol C indicates a distance between two adjacent heating elements 302.

The shortest current path MS described above is a path through which a current is allowed to flow most easily, and is a main portion of the heating element 302 that generates heat. The width of this shortest current path MS as seen in the X direction is denoted by a width Wh (Wh1-1, Wh1-2, Wh1-3). The width Wh is determined by the angle θ between the heating element 302 and the X direction, the length A, and the length B. Reference symbol SP (SP1-1, SP1-2) indicates the width of a gap between two adjacent shortest current paths MS. The widths SP1-1 and SP1-2 are the same in value. The width Wh is the same in value for the other heat generation blocks, and the gap width SP is also the same in value. Reference symbol SPB12 indicates the width of a gap between the shortest current path MS of the heating element 302*b*-1-3 in the heat generation block HB1 and the shortest current path MS of the heating element 302*b*-2-1 in the heat generation block HB2. The value of the width SPB12 is the same as the width SP1-1 and the width SP1-2.

Reference symbol L1 indicates the total width given by the sum of all shortest current paths MS and all gaps SP in one row of heating elements (for example, a row of heating elements 302*b*) in the heat generation block HB1. The ratio R1 of the total width WhALL (=(Wh1-1)+(Wh1-2)+(Wh1-3)) to the width L1 in the heat generation block HB1 can be given by equation 1. Note that in the case of the heat generation block HB1, the total width WhALL is given as WhALL=Wh×3.

$$R1=Wh\mathrm{ALL}/L1 \tag{1}$$

This relationship holds not only in the heat generation block HB1 but also in the other heat generation blocks (such as the heat generation block HB7 shown in FIG. 5.).

Let n denote the number of heating elements in one row of heating elements provided in one heat generation block, and let Lx denote the total sum of widths of all shortest current paths MS and all gaps SP in one row of heating elements in one heat generation block. Then, the ratio Rb for one heat generation block is given as follows.

$$Rb=(n\times Wh)/Lx \tag{2}$$

The heater 300 as a whole satisfies the following equation 3. Note that in equation 3, m denotes the total number of heating elements in one row of heating elements provided in the heater 300, and L denotes the total sum of widths of all shortest current paths MS and all gaps SP (including gaps between adjacent heat generation blocks, such as the gap SPB12) in one row of heating elements provided in the heater 300. That is, the ratio R for the overall heater 300 is given by $$R=(m\times Wh)/L \tag{3}$$

Figure 9A:
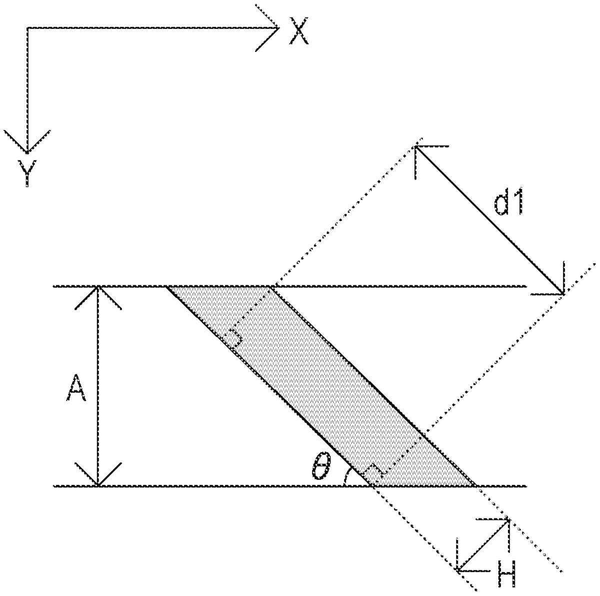
FIGS. 9A and 9B each are a diagram showing a shape of a heating element.
Figure 9B:
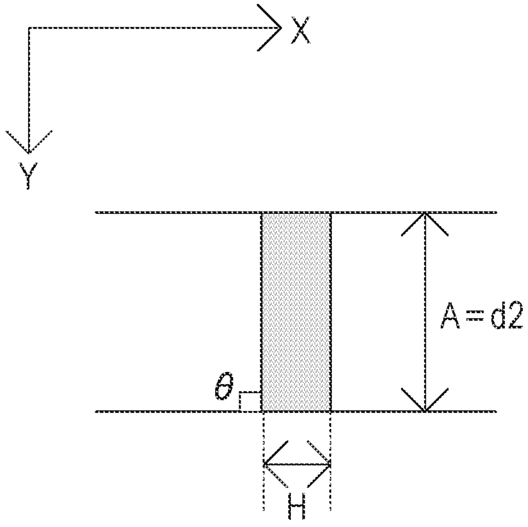

Next, shapes of heating elements are described. The target value of the resistance of the heating element 302 of the heater 300 is determined by the power used for fixing and the AC voltage input to the printer. The length of the heater 300 in the Y direction is determined by the diameter of the pressure roller 208 and the width of the fixing nip N, and this fact limits the region where it is allowed to form the heating elements 302 on the heater 300. One method of arranging the heating elements 302 in this region so as to achieve a specific resistance value may be, for example, to form the heating elements 302 uniformly between the conductor 301 and the conductor 303 in each heat generation block (that is, each heat generation block has only one heating element). However, to achieve the specific resistance value of the heating elements 302 within the limited region in which it is allowed to form the heating elements 302, it may be necessary for the heating elements 302 to have a high sheet resistance. The value of the sheet resistance of the heating elements 302 is adjusted by amounts of materials such as glass mixed in the heating elements 302. The larger the amount of a mixed material, the higher the sheet resistance. However, the higher the sheet resistance and the larger the amount of the mixed material in the heating elements 302, the weaker the resistance to surge and the more likely it is that cracking will occur in the heating elements 302. From the above point of view, the value of the sheet resistance may need to be as small as possible. Relationship between inclination of heating element and sheet resistance FIGS. 9A and 9B each are a diagram showing a part of a heating element. The sheet resistance of the heating elements 302 will be described below with reference to FIG. 9. The inclination θ of the heating elements 302 shown in FIG. 9A is 45 degrees, and that shown in FIG. 9B is 90 degrees. The distance from the conductor 301 to the conductor 303 is equal to the distance A, as in FIG. 5.

Furthermore, H denotes the shortest distance between two long sides of the parallelogram of the heating element 302. Let d denote the length of the region having the width H in the parallelogram of the heating element 302. The length d in the case of the shape of FIG. 9A is d1, while the length d in FIG. 9B is d2. As shown in FIG. 9B, in a case where θ=90 degrees, the length d2 is equal to the length A. Hereinafter, the width H will also be referred to as a resistor pattern width H, and the length d will also be referred to as a resistor pattern length d.

The resistance value ( ) of the heating element 302 configured as described above can be given by equation 4.

$$\text{resistance of heating element } (\Omega)=\text{sheet resistance } (\Omega/\text{sq})\times\text{resistor pattern length } d \text{ (mm)}/\text{resistor pattern width } H \text{ (mm)} \quad (4)$$

As described above, the value of resistance per one heating element 302 is determined by the electric power and voltage applied to the fixing unit. As can be seen from equation 4, in a case where the value of the resistance of the heating element 302 and the resistor pattern width H are fixed, it is possible to obtain a lower value for the sheet resistance by increasing the resistor pattern length d.

Figure 10:
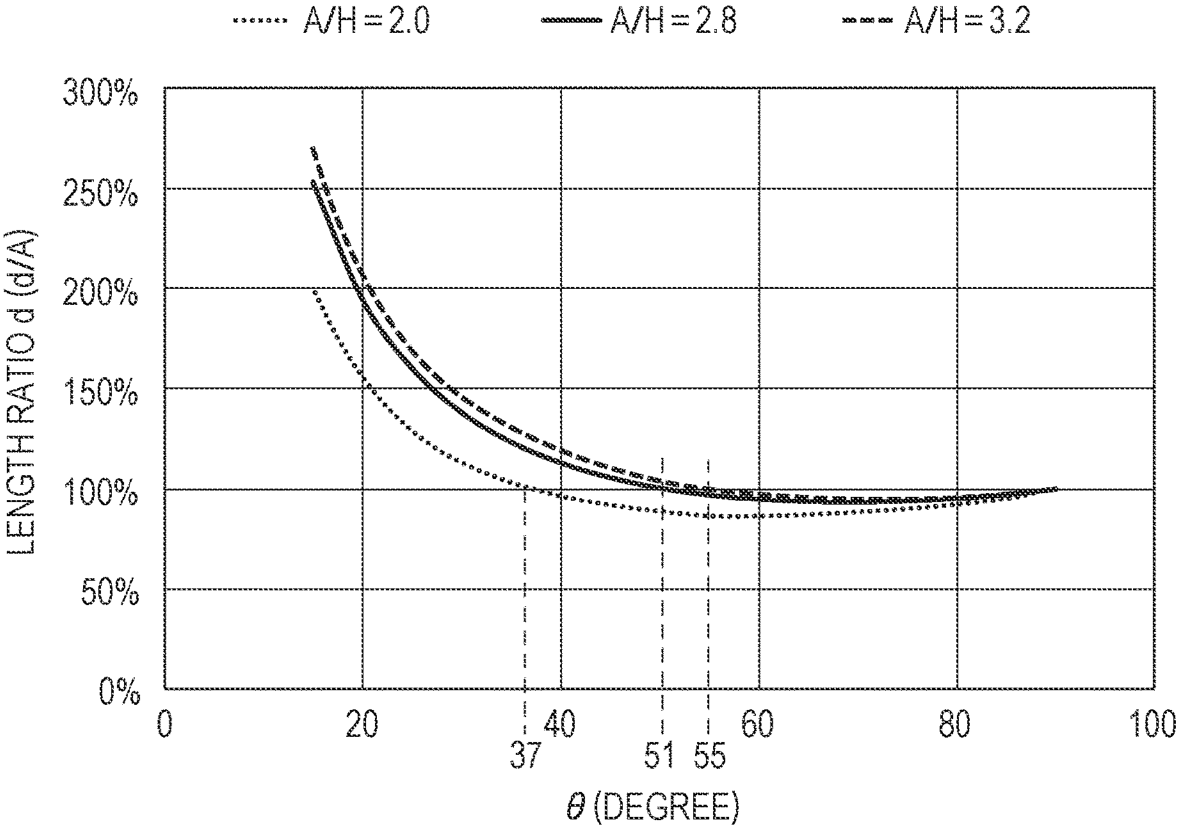
FIG. 10 is a diagram showing a relationship between an inclination θ and a relative length d.

FIG. 10 shows a relationship between the inclination θ and the relative length d with reference to the length d2 at θ=90 degrees (that is, the relative length is given by the ratio d/A, which is equal to 100% when d=d2). In FIG. 10, three curves are plotted for different three values of ratio A/H (the ratio of the length A to the width H) of 2.0, 2.8, and 3.2. As shown in FIG. 10, when A/H=2.0, it is allowed to increase the length d by tilting the heating element more than the case where θ=37 degrees. Similarly, when A/H=2.8, it is allowed to increase the length d by tilting the heating element more than the case where θ=51 degrees, while when A/H=3.2, it is allowed to increase the length d by tilting the heating element more than the case where θ=55 degrees. In any case, as the heating element is tilted more, the length d becomes larger, and the sheet resistance can be accordingly set to a lower value.

Relationship Between Ratio R and Temperature Unevenness in the Longitudinal Direction of the Heater 300

Figures 6, 7:
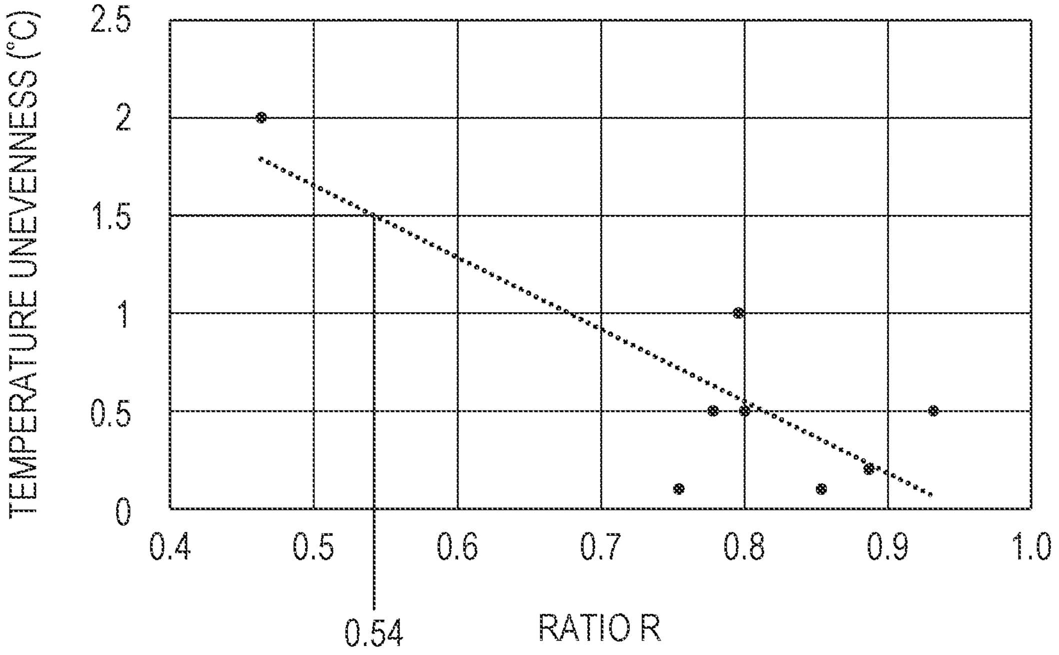
FIG. 6 is a diagram showing a relationship between temperature unevenness and ratio R in the first embodiment.
FIG. 7 is a diagram showing data plotted in FIG. 6.

FIG. 6 shows a relationship between a heat generation ratio R and temperature unevenness in the longitudinal direction of the heater 300. FIG. 7 shows detailed data plotted in FIG. 6.

As described above, in order to achieve a small sheet resistance for the heating elements, it may be desirable to thin out and tilt the heating elements. However, when the heating elements is thinned out too much, the thinned portion becomes a non-heat generation region, which causes temperature unevenness to occur in the longitudinal direction X of the heater 300. When the temperature unevenness is large, there is a possibility that an image defect such as a fixing defect occurs. Therefore, in order to achieve a small sheet resistance while suppressing the temperature unevenness, it is necessary to set both the inclination θ of the heating elements and the ratio R of the width Wh to the width L to optimum values. Note that in present embodiment, it is assumed that a maximum allowable value of the temperature unevenness (a difference between a maximum temperature and a minimum temperature) is 1.5° C.

The interval C between adjacent heating elements is set to a minimum possible value allowed in manufacturing.

As shown in FIG. 6, the larger the ratio R, the smaller the temperature unevenness tends to be. An approximate line of plotted values indicates that, to achieve a temperature unevenness equal to or smaller than the maximum allowable value of 1.5° C., it is necessary that the ratio R is equal to or larger than 0.54. On the other hand, if the inclination θ of the heating elements is too small, then, for example, the region of the width Wh1 and the region of the width Wh2 may overlap in the X direction, which causes the temperature unevenness to become large. Therefore, the optimum ratio R is smaller than 1.

Thus, it is possible to achieve a small temperature unevenness by setting the ratio R such that 0.54≤ratio R<1. Regarding the sheet resistance, as shown in FIG. 7, when the ratio R is in the range of 0.54≤ratio R<1, the ratio d/A is larger than 120%, and thus it is possible to achieve a small value for the sheet resistance.

As described above, by setting the ratio R so as to satisfy 0.54≤ratio R<1, it is possible to achieve a low sheet resistance, and thus it is possible to achieve both the suppression of fixing unevenness due to heater temperature unevenness and high surge resistance.

Second Embodiment

In a second embodiment, a heater 1300 includes heat generation blocks configured so as to cover main paper sizes. However, in end parts, as seen in the X direction, of the heat generating region, heat is taken to the region where no heating elements exist, which tends to cause the temperate to decrease at ends of paper. To handle the above situation, in the present embodiment, values of resistance of the heating elements 302 in the heat generation block HB1 and the heat generation block HB7 are set to be lower than those of the heating elements in the other heat generation blocks such that greater amounts of heat are generated in the heat generation blocks HB1 and HB7 than in the other heat generation blocks.

Figure 8:
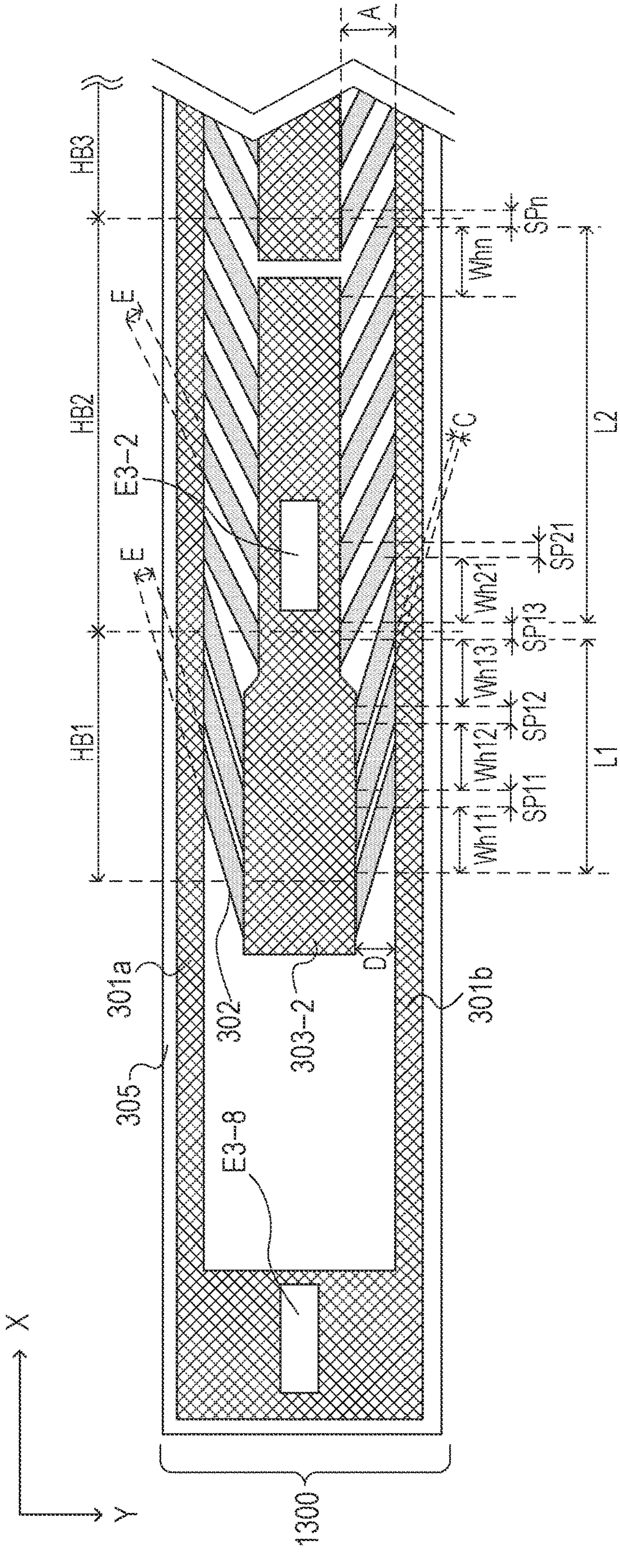
FIG. 8 is a diagram illustrating a configuration of a heater according to a second embodiment.

FIG. 8 is a diagram showing the shape of the heating element in the heat generation block HB1 and the shape of the heating element in the heat generation block HB2 of the heater 1300 according to the present embodiment. The heat generation blocks HB1 (HB7) and HB2 (HB6) are electrically connected to each other via a conductor 303-2 (a conductor 303-6). An electrode E3-2 (and electrode E3-6) is formed on the conductor 303-2 (the conductor 303-6). In the present embodiment, as in the first embodiment, L1 denotes the total sum of all shortest current paths MS and widths of all gaps SP in one row of heating elements in the heat generation block HB1, D denotes the distance between the conductor 301*b* and conductor 303-1, Wh11 (=Wh12, Wh13) denotes the width of the shortest current path, SP11 (=SP12, SP13) denotes the width of the gap between two adjacent shortest current paths MS, and n1 denotes the number of heating elements in one row of heating elements in the heat generation block HB1. Furthermore, L2 denotes the total sum of all shortest current paths MS in one row of heating elements in the heat generation block HB2, A denotes the distance between the conductor 301*b* and conductor 303-2, Wh21 (=Whn)) denotes the width of the shortest current path, SP21 (=Spn) denotes the width of the gap between two adjacent shortest current paths MS, and n2 denotes the number of heating elements in one row of heating elements in the heat generation block HB2.

The width E of the parallelogram of the heating element 302 has the same value in the heat generation block HB1 and in the heat generation block HB2, and the interval C between adjacent heating elements in the heat generation block HB1 is set to a minimum value allowed in manufacturing. In order to make Wh11 equal to Wh21 and SP11 equal to SP21, the distance D is set to be smaller than the distance A and the inclination of the heating element 302 is set to be smaller in the heat generation block HB1 than in the heat generation block HB2. This makes it possible to achieve a smaller value of resistance for the heating element in the heat generation block HB1 than for the heating element in the heat generation block HB2 using the same heat generation material.

To reduce the temperature unevenness, the ratio R1 in the heat generation block HB1 can be calculated according to equation 5, and the ratio R2 in the heat generation block HB2 can be calculated according to equation 6.

$$R1=(n1\times Wh11)/L1 \quad (5)$$

$$R2=(n2\times Wh21)/L2 \quad (6)$$

Thus it is possible to reduce the temperature unevenness by setting the resistance of the heating elements to be different between the heat generation block HB1 and the heat generation block HB2 and setting the shape of heating elements in each block so as to satisfy 0.54≤ratio R<1 as described above according to the present embodiment.

As described above, also in the case where the resistance of heating elements is different among blocks, a low sheet resistance can be achieved by setting the ratio R such that 0.54≤ratio R<1 in each block, and thus it is possible to achieve both suppression of fixing unevenness due to heater temperature unevenness and high surge resistance.

Third Embodiment

Figure 11:
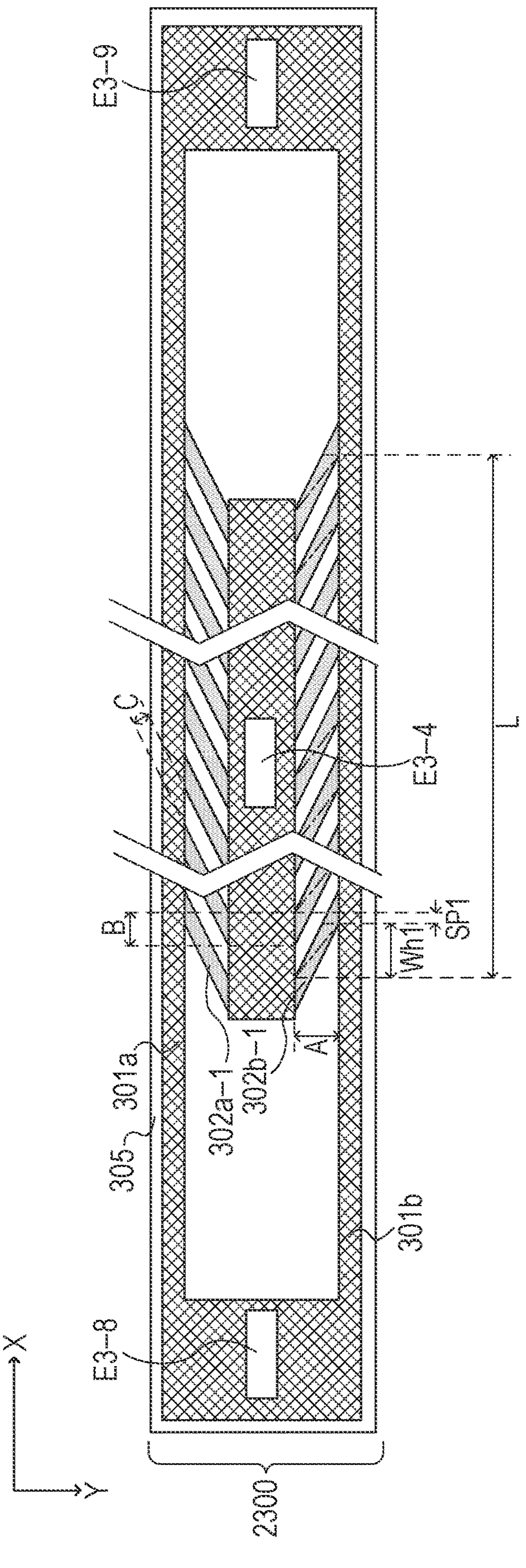
FIG. 11 is a diagram showing a heater according to a third embodiment.

FIG. 11 shows a heater 2300 according to a third embodiment. In the first and second embodiments described above, a plurality of heat generation blocks generate heat independently. However, in the third embodiment, the heater 2300 has only one heat generation block.

Also in the heater 2300 having such a configuration, by setting the ratio R so as to satisfy 0.54≤ratio R<1, it is possible to achieve a low sheet resistance and thus it is possible to achieve both suppression of fixing unevenness due to heater temperature unevenness and high surge resistance.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2021-042865 filed Mar. 16, 2021, which is hereby incorporated by reference herein in its entirety.

What is claimed is:

1. A heater for use in an image heating apparatus, the heater comprising:

a substrate;

a first conductor and at least one second conductor provided on the substrate along a longitudinal direction of the substrate; and a plurality of heating elements arranged between the first conductor and the at least one second conductor and electrically connected in parallel to the first conductor and the at least one second conductor, wherein, when (A) n denotes a number of heating elements, connected to one second conductor, in one row of heating elements disposed on the heater, (B) a width L denotes (i) a sum (n×Wh) of widths, with respect to the longitudinal direction, of shortest current paths of all respective heating elements connected to the one second conductor plus (ii) a sum of widths, with respect to the longitudinal direction, of respective gaps between adjacent shortest current paths, and a (C) ratio R denotes a ratio of the sum (n×Wh) of widths to the width L, the plurality of heating elements are configured so as to satisfy 0.54≤the ratio R<1.

2. The heater according to claim 1, wherein a plurality of second conductors are provided so as to extend in the longitudinal direction, and the plurality of heating elements are connected in parallel to each of the plurality of second conductors.

3. The heater according to claim 1, wherein the plurality of heating elements are arranged in a plurality of rows and disposed on the substrate such that the plurality of rows of heating elements are arranged side by side in a lateral direction of the substrate.

4. An image heating apparatus for heating an image formed on a recording sheet, the image heating apparatus comprising:

a film having a cylindrical shape;

the heater according to claim 1, wherein the heater is provided in an internal space of the film; and a roller configured to form a nip part together with the heater via the film, wherein the recording sheet having the image is heated when the recording sheet is being transported while being held by the nip part.

5. The image heating apparatus according to claim 4, wherein a plurality of second conductors are arranged so as to extend in the longitudinal direction, and the plurality of heating elements are connected in parallel to each of the plurality of second conductors.

6. The image heating apparatus according to claim 4, wherein the plurality of heating elements are arranged in a plurality of rows and disposed on the substrate such that the plurality of rows of heating elements are arranged side by side in a lateral direction of the substrate.

7. The heater according to claim 1, wherein the plurality of heating elements are inclined to both the longitudinal direction and a direction perpendicular to the longitudinal direction.

8. The heater according to claim 7, wherein lengths of the shortest current paths of all the respective heating elements are longer than a gap of the first conductor and the at least one second conductor.

9. The heater according to claim 7, wherein, if d is a length of a long side of rectangle included in one of the plurality of heating elements, which has two corners at both ends of a shortest current path, and A is a gap of the first conductor and the at least one second conductor, a ratio d/A satisfies 127%≤the ratio d/A≤166%.

10. The heater according to claim 7, wherein the plurality of heating elements are all arranged in parallel.

11. A heater for use in an image heating apparatus, the heater comprising:

a substrate;

a first conductor and at least one second conductor provided on the substrate along a longitudinal direction of the substrate; and a plurality of heating elements arranged between the first conductor and the at least one second conductor and electrically connected in parallel to the first conductor and the at least one second conductor, wherein the plurality of heating elements are inclined to both the longitudinal direction and a direction perpendicular to the longitudinal direction, and wherein each shape of the plurality of heating elements is a parallelogram other than a rectangle, wherein the parallelogram of each of the plurality of heating elements includes a rectangle area, and wherein, if d is a length of a long side of the rectangle area included in one of the plurality of heating elements, which has two corners at both ends of a shortest current path of the one of the plurality of heating elements, and A is a gap of the first conductor and the at least one second conductor, a ratio d/A satisfies 127%≤the ratio d/A≤166%.

12. The heater according to claim 11, wherein a plurality of second conductors are provided so as to extend in the longitudinal direction, and the plurality of heating elements are connected in parallel to each of the plurality of second conductors.

13. The heater according to claim 11, wherein the plurality of heating elements are arranged in a plurality of rows and disposed on the substrate such that the plurality of rows of heating elements are arranged side by side in the direction perpendicular to the longitudinal direction.

14. The heater according to claim 11, wherein lengths of shortest current paths of all respective heating elements are longer than the gap of the first conductor and the at least one second conductor.

15. The heater according to claim 11, wherein the plurality of heating elements are all arranged in parallel.

16. An image heating apparatus for heating an image formed on a recording sheet, the image heating apparatus comprising:

a film having a cylindrical shape;

the heater according to claim 11, wherein the heater is provided in an internal space of the film; and a roller configured to form a nip part together with the heater via the film, wherein the recording sheet having the image is heated when the recording sheet is being transported while being held by the nip part.

17. The image heating apparatus according to claim 16, wherein a plurality of second conductors are arranged so as to extend in the longitudinal direction, and the plurality of heating elements are connected in parallel to each of the plurality of second conductors.

18. The image heating apparatus according to claim 16, wherein the plurality of heating elements are arranged in a plurality of rows and disposed on the substrate such that the plurality of rows of heating elements are arranged side by side in the direction perpendicular to the longitudinal direction.

* * * * *